United States Patent [19]
Reisinger et al.

[11] Patent Number: 5,805,985
[45] Date of Patent: Sep. 8, 1998

[54] UNIVERSAL ADAPTER KIT FOR MINI MICROPHONE

[76] Inventors: William S. Reisinger, 2078 Spring St., York, Pa. 17404; Wren A. Clegg, 103 Meals Dr., Carlisle, Pa. 17013

[21] Appl. No.: 494,240

[22] Filed: Jun. 23, 1995

[51] Int. Cl.⁶ .................................................. H04B 1/38
[52] U.S. Cl. ............................ 455/90; 455/128; 455/351; 381/91; 381/169
[58] Field of Search ................................ 455/89, 90, 128, 455/95, 99, 100, 345, 346, 349, 351, 575, 344, 66; 381/91, 122, 168, 169, 92

[56] References Cited

U.S. PATENT DOCUMENTS

| | | | |
|---|---|---|---|
| 3,668,526 | 6/1972 | Raskin | 455/18 |
| 3,944,924 | 3/1976 | Miyachi | 455/89 |
| 4,061,971 | 12/1977 | Barrons | 455/90 |
| 4,143,320 | 3/1979 | Johnson | 455/90 |
| 4,151,468 | 4/1979 | Kerr | 455/89 |
| 5,038,400 | 8/1991 | Baracat et al. | 455/90 |
| 5,406,265 | 4/1995 | Trozzo et al. | 340/632 |
| 5,584,052 | 12/1996 | Gulau et al. | 455/99 |

*Primary Examiner*—Nguyen Vo
*Attorney, Agent, or Firm*—Aquilino & Welsh

[57] ABSTRACT

A universal adapter kit for a two-way radio having a microphone jack. The adapter kit includes a universal keying adapter including a radio plug for attachment to the microphone jack of the standard two-way radio. The adapter kit further includes a microphone connected to the keying adapter, wherein the microphone is adapted to be selectively secured to a support structure, and a keying switch connected to the keying adapter. The keying adapter includes circuitry permitting an individual to use the microphone and the keying switch to transmit message over a wide variety of two-way radios without modifying the radio.

17 Claims, 2 Drawing Sheets

UNIVERSAL ADAPTER KIT FOR MINI MICROPHONE

BACKGROUND OF THE INVENTION

1. Field of the Invention

The invention relates to a universal adapter kit for two-way radio microphones. More particularly, the invention relates to a universal adapter kit for citizen band (CB) radios, wherein the adapter kit includes a remote microphone and a keying switch.

2. Description of the Prior Art

Conventional CB radios require a vehicle operator to simultaneously hold a microphone, steer a vehicle and shift gears. In order to simultaneously perform these three functions an operator truly needs three hands. However, since human beings normally have at most two hands, the operator desiring to use a CB radio must find a way to perform these three functions with only two hands. Often this requires the operator to place himself or herself in a compromising position, which affects the safety of those individuals driving in the vehicle and those individuals located near the vehicle.

Attempts have been made to overcome this problem by providing drivers with portable microphones that may be worn by the driver. For example, U.S. Pat. No. 5,118,309 to Ford discloses an accessory connector and adapter for a communications radio wherein the interface of the radio with a remote microphone, a remote push-to-talk button and a remote earphone is accomplished via a single electrical connector containing a plurality of electrical contacts. Additionally, U.S. Pat. No. 3,944,924 to Miyachi discloses a CB radio transceiver designed specifically for use on a motorcycle. FIG. 1 provides a diagram of the entire assembly which includes, among other components, a remote keying switch and a remote microphone which is intended to be mounted on the user's helmet. Similarly, U.S. Pat. No. 2,381,077 to Obszarny shows a switching device enclosed in a hand grip, the grip containing a plurality of switches strategically positioned on the outer surface of the grip and used by the operator to control a variety of devices, including a radio. Further, U.S. Pat. No. 4,325,143 to Kerr shows an apparatus containing a remote keying switch and microphone holder which enable an operator to use the radio without requiring the operator to remove his or her hands from the controls of an automobile.

However, nothing in the prior art provides an interface permitting an individual to utilize remote CB microphones and keying switches with a wide variety of currently available CB radios. That is, none of the prior art devices are capable of matching the microphone and keying switch impedance with the natural impedances found in a wide variety of CB radios. The present invention provides such a universal adapter kit for CB radios and other two-way radios.

SUMMARY OF THE INVENTION

It is, therefore, an object of the present invention to provide a universal adapter kit for a two-way radio having a microphone jack. The adapter kit includes a universal keying adapter including a radio plug for attachment to the microphone jack of the standard two-way radio. The adapter kit further includes a microphone connected to the keying adapter, wherein the microphone is adapted to be selectively secured to a support structure, and a keying switch connected to the keying adapter. The keying adapter includes circuitry permitting an individual to use the microphone and the keying switch to transmit messages over a wide variety of two-way radios without modifying the radio.

It is another object of the present invention to provide a microphone including a clip for securing the microphone to a support structure.

It is also an object of the present invention to provide a keying adapter including interchangeable four pin radio plugs and five pin radio plugs.

It is a further object of the present invention to provide a keying adapter including a radio plug releasably attached to a main body, thereby permitting a four pin radio plug and a five pin radio plug to be used with the main body.

It is also a further object of the present invention to provide a keying switch mounted on the shifter of a vehicle.

It is another object of the present invention to provide a universal adapter kit for use with a citizen band radio.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
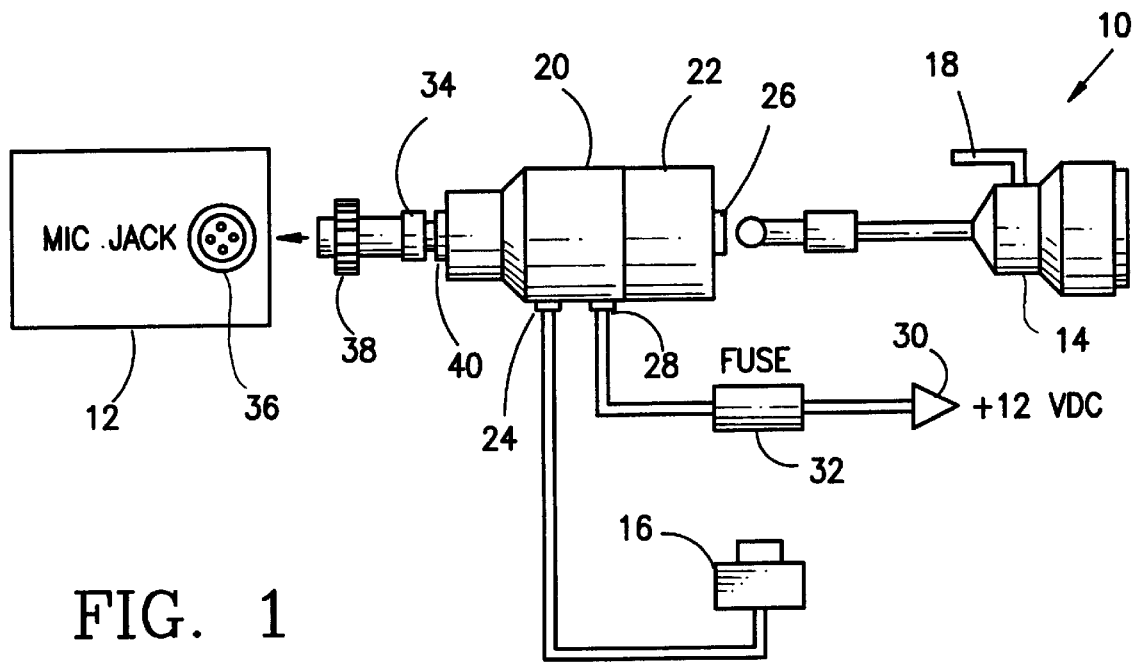
FIG. 1 is a schematic of the present adapter kit.

With reference to FIG. 1, the present universal adapter kit 10 is disclosed. The adapter kit permits an operator to access a two-way radio, for example, a CB radio 12, with a remote microphone 14 and a keying switch 16. The invention will now be described in use with CB radios, although it could be used with any two-way radio without departing from the spirit of the invention.

The adapter kit includes a miniature directional microphone 14 having a clip 18 secured thereto. The directional microphone limits interference from external sounds often found in noisy truck cabins. Although a directional microphone is used in the preferred embodiment, other microphones could be used without departing from the spirit of the invention. The clip 18 enables an operator to secure the microphone 14 to his or her shirt, or any other support object which is convenient for positioning the microphone near the operator.

The adapter kit 10 also includes a keying switch 16 permitting the operator to selectively transmit messages through the microphone 14. The keying switch 16 works in the same manner as the keying switch on a conventional CB microphone. That is, when the keying switch is depressed the operator is able to speak into the microphone 14 and transmit a message.

Both the microphone 14 and the keying switch 16 are connected to a CB radio via the keying adapter 20, that is, the interface between the CB radio, and the keying switch 16 and microphone 14. The keying adapter 20 includes a main body 22 which includes keying switch connection 24, a microphone jack 26, and a connection 28 for a 12 Volt power supply 30 and a fuse 32. The keying adapter 20 also includes a radio plug 34 for connection with the microphone jack 36 of a CB radio 12. The radio plug 34 is secured to the microphone jack 36 by a screw-on or compression type ring 38.

Since currently available CB radios use microphone jacks having four pins or five pins, the main body 22 is constructed to accept both a four pin radio plug and a five pin radio plug. For the purpose of this application, the four pin radio plug and the five pin radio plug are preferably female connectors sized to make electrical contact with the pins of the CB radio's microphone jack 36, although other connectors could be used without departing from the spirit of the present invention.

With this in mind, the radio plug 34 is releasably connected to the main body 22, thereby permitting the use of both a four pin radio plug and a five pin radio plug. The four pin radio plug and the five pin radio plug are releasably connected to the main body by a compression bracket 40.

Figure 2:
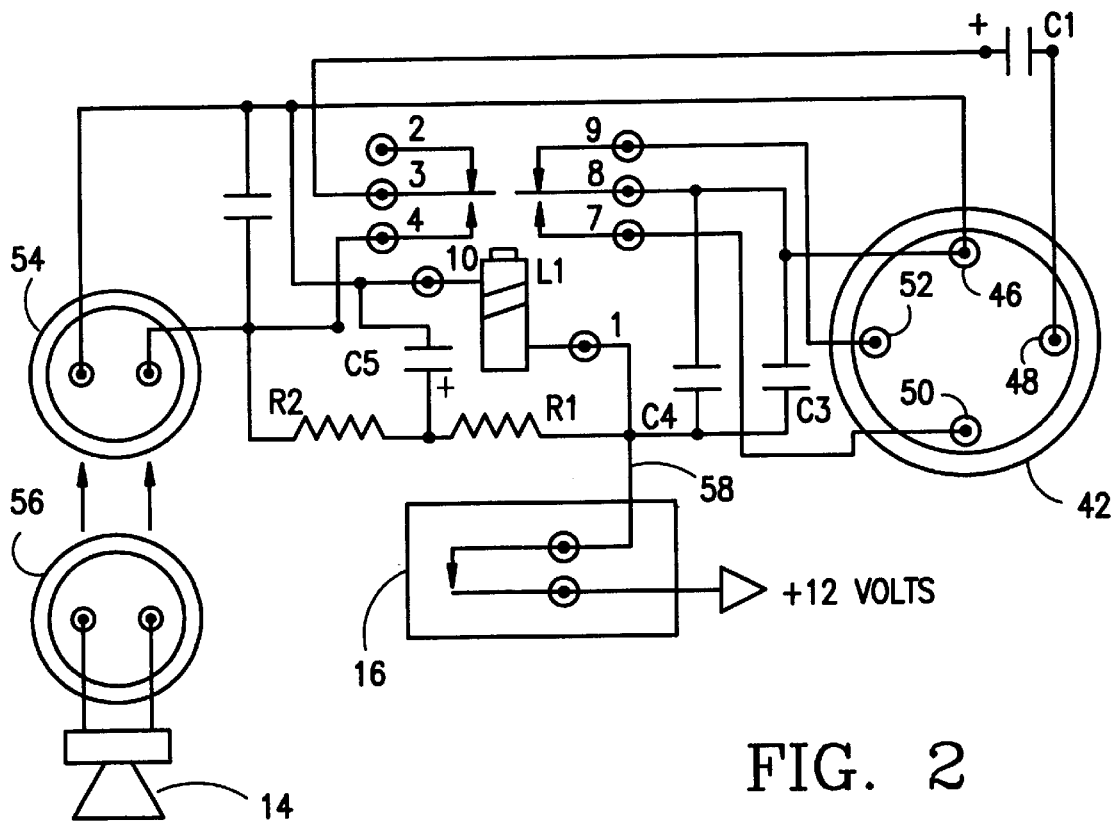
FIG. 2 is a circuit diagram for the present adapter kit when used with a four pin radio plug.
Figure 3:
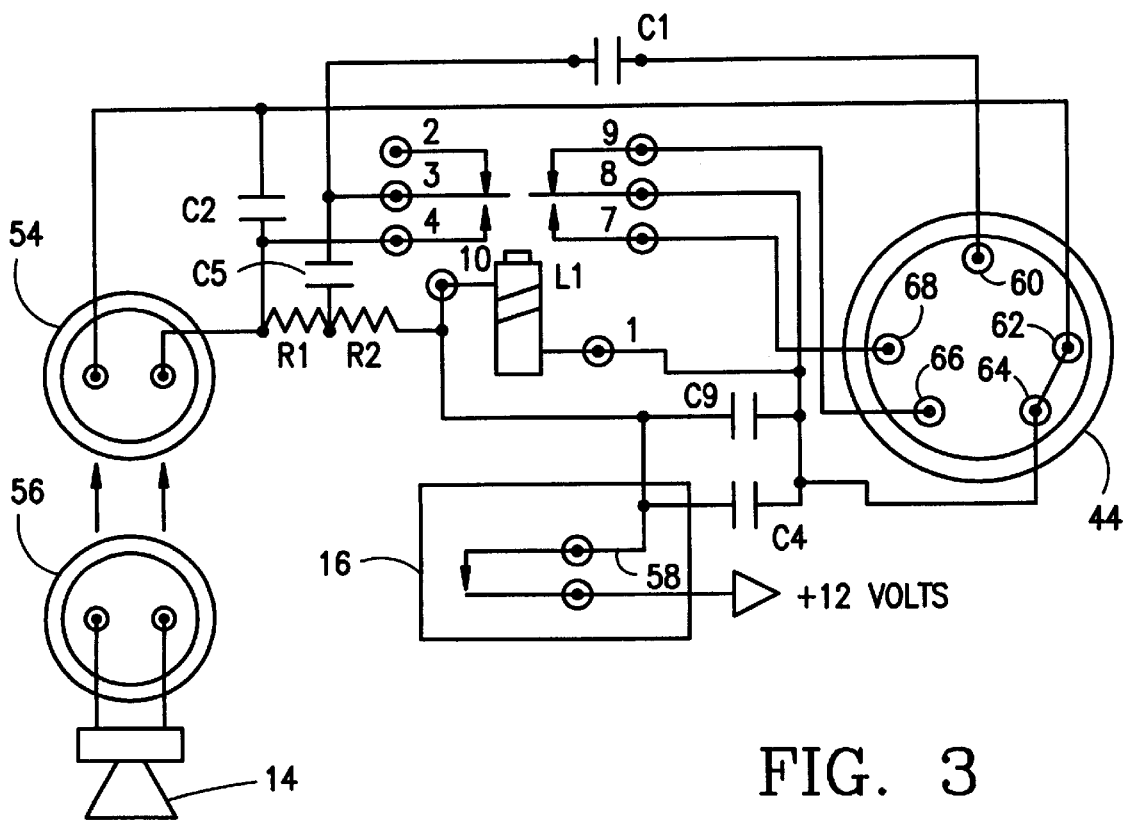
FIG. 3 is a circuit diagram for the present adapter kit when used with a five pin radio plug.

The circuitry used by the keying adapter in the four pin radio plug 42 is similar to the circuitry used for the five pin radio plug 44, and is shown in FIGS. 2 and 3, respectively. This circuitry, in conjunction with the adaptable radio plugs, permit the present universal adapter kit to work with a wide variety of CB radios without altering the universal adapter kit or the CB radio to which the remote adapter is connected. The circuitry used by the keying adapter matches the impedance of the microphone and keying switch with the impedances found in currently available two-way radios.

With reference to FIG. 2, the circuitry of the keying adapter having the four pin radio plug 42 connected to the main body 22 is shown. The four pins correspond to the internal CB radio circuitry in the following manner; pin one 46 links the ground of the CB microphone jack, pin two 48 links the microphone input of the CB microphone jack, pin three 50 links the transmitter keying of the CB microphone jack, and pin four 52 links the speaker ground of the CB microphone jack. The keying adapter 20 further includes a two contact microphone jack 54 for connecting the microphone 14 thereto. Similarly, the microphone 14 of the present invention includes a two contact jack 56 adapted for connection to the microphone jack 54 of the keying adapter 20. Additionally, the keying adapter 20 is coupled to the remote keying switch 16 via connection 58.

The keying adapter circuitry shown in FIG. 2 includes two resistors and five capacitors. The first resistor R1 has a resistance of 15 kiloohms and the second resistor R2 has a resistance of 15 kiloohms. With regard to the capacitors, the first capacitance C1 is 0.47 mf, the second capacitance C2 is 0.001 mf, the third capacitance C3 is 0.001 mf, the fourth capacitance C4 is 0.01 mf, and the fifth capacitance C5 is 2.2 mf. The circuit further includes a 12 Volt Double Pole Double Throw (DPDT) relay L which is actuated by the remote keying switch 16. The DPDT relay L actuates the radio circuitry to permit the transmission of messages.

Similarly, FIG. 3 discloses the circuitry for the keying adapter having the five pin radio plug 44 attached to the main body 22. The five pins correspond to the internal CB radio circuitry in the following manner; pin one 60 links the microphone input of the CB microphone jack, pin two 62 links the microphone ground of the CB microphone jack, pin three 64 links the ground of the CB microphone jack, pin four 66 links the speaker ground of the CB microphone jack, and pin five 68 links the transmitter keying of the CB microphone jack. As with the four pin keying adapter, a two contact microphone jack 54 for connecting the microphone 14 to the CB radio is provided. Additionally, the keying adapter is coupled to the remote keying switch via connection 58.

As with the circuit shown in FIG. 2, the circuit shown in FIG. 3 includes two resistors and five capacitors. The first resistor R1 has a resistance of 15 kiloohms and the second resistor R2 has a resistance of 15 kiloohms. With regard to the capacitors, the first capacitance C1 is 0.47 mf, the second capacitance C2 is 0.001 mf, the third capacitance C3 is 0.001 mf, the fourth capacitance C4 is 0.01 mf, and the fifth capacitance C5 is 2.2 mf. The circuit further includes a 12 Volt DPDT relay L.

Figure 4:
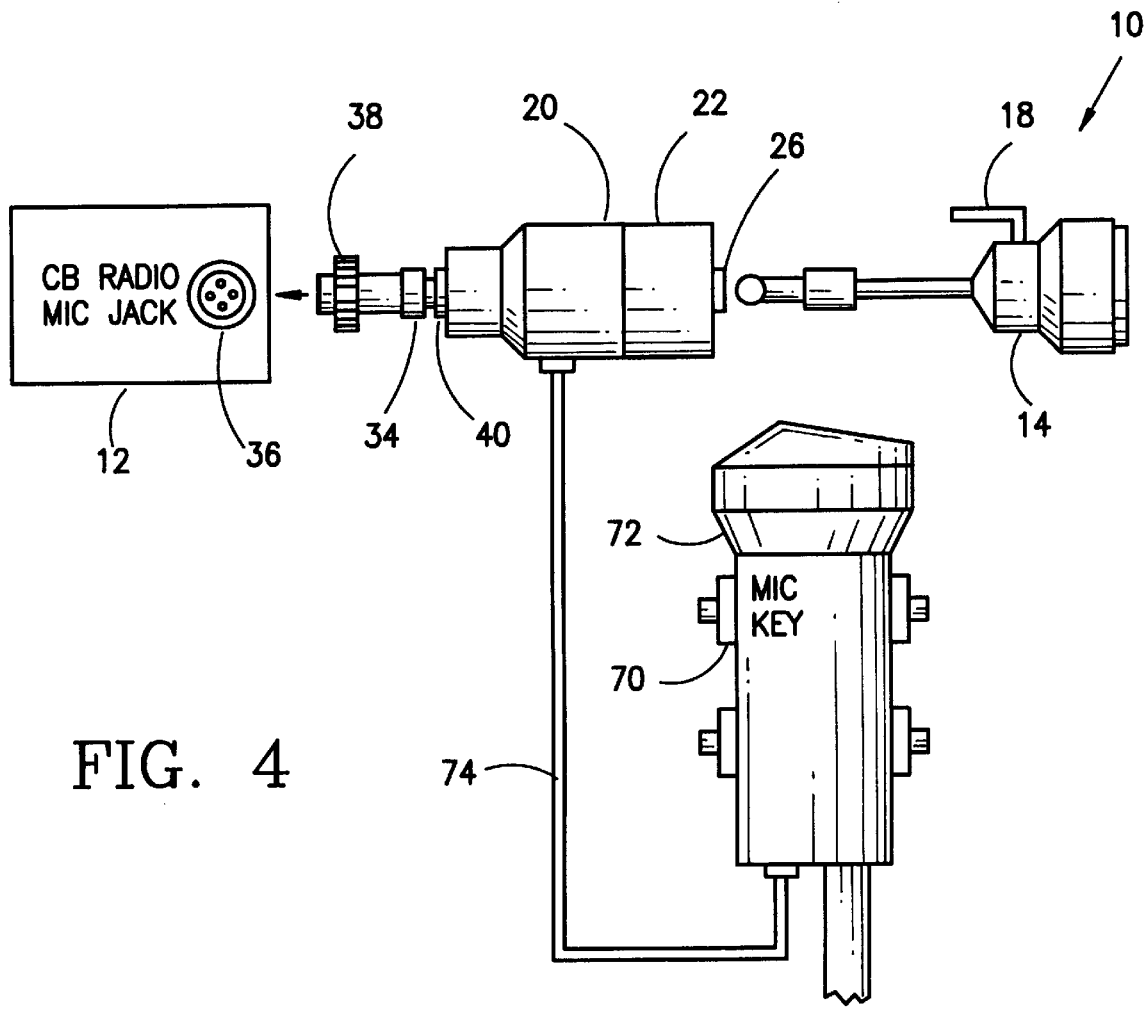
FIG. 4 is a schematic of the present adapter kit with the keying switch incorporated in a housing about a shifter pole.

With reference to FIG. 4, the keying switch 70 may be mounted to the shifter 72 of a vehicle. The microphone 14 is connected to the keying adapter 20 in the same manner discussed above, while the keying switch 70 is mounted on the shifter and connected to the keying adapter via connection 74. The 12 V power supply is supplied through the shifter 72 and there is no need for a separate power supply 30 or fuse 32 in this embodiment. Other than mounting the keying switch on the shifter control panel this embodiment functions in the same manner outlined above.

While various preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. A universal adapter kit for a two-way radio having a microphone jack permitting a user to access the two-way radio with a variety of microphones and keying switches without modifying the two-way radio, microphone or keying switch, comprising:
   a universal keying adapter including a radio plug for attachment to the microphone jack of the two-way radio;
   a microphone connected to the keying adapter, the microphone being selectively securable to a support structure;
   a keying switch connected to the keying adapter;
   wherein the keying adapter includes circuit means for matching impedance of the microphone and impedance of the keying switch with an impedance of a wide variety of two-way radios to permit the microphone and the keying switch to be used with a selected two-way radio without modifying the two-way radio or the circuitry means of the universal adapter kit.

2. The universal adapter kit according to claim 1, wherein the microphone includes a clip for securing the microphone to a support structure.

3. The universal adapter kit according to claim 1, wherein the keying adapter includes a four pin radio plug.

4. The universal adapter kit according to claim 1, wherein the keying adapter includes a five pin radio plug.

5. The universal adapter kit according to claim 1, wherein the keying adapter includes a main body.

6. The universal adapter kit according to claim 5, wherein the radio plug is releasably attached to the main body permitting a four pin radio plug or a five pin radio plug to be used with the main body.

7. The universal adapter kit according to claim 1, wherein the microphone is releasable attached to the keying adapter.

8. The universal adapter kit according to claim 1, wherein the keying switch is mounted to a shifter pole.

9. The universal adapter kit according to claim 8, wherein the microphone is releasably connected to the keying adapter.

10. The universal adapter kit according to claim 9, wherein the keying adapter includes a main body.

11. The universal adapter kit according to claim 10, wherein the radio plug is releasably attached to the main body permitting a four pin radio plug or a five pin radio plug to be used with the main body.

12. The universal adapter kit according to claim 1, wherein the two-way radio is a citizen band radio.

13. A universal keying adapter for a two-way radio having a microphone jack permitting a user to access the two-way radio with a variety of microphones and keying switches without modifying the two-way radio, microphone or keying switch, comprising:

a main adapter body including a microphone jack and a keying switch connection;

a radio plug connected to the main adapter body, wherein the radio plug is compatible with the microphone jack of the two-way radio;

A microphone connected to the main adapter body;

a key switch connected to the keying switch connection;

and circuit means for matching impedance of the microphone and impedance of the keying switch with an impedance of the wide variety of two-way radios to permit an individual to use the microphone and the keying switch to transmit messages over a wide variety of two-way radios without modifying the two-way radio, the circuit means being disposed within the main body and electronically connected to the radio plug, the microphone and the keying switch connection.

14. The universal keying adaptor according to claim 13, wherein the keying adapter includes a four pin radio plug.

15. The universal keying adaptor according to claim 13, wherein the keying adapter includes a five pin radio plug.

16. The universal keying adaptor according to claim 13, wherein the radio plug is releasably attached to the main adapter body permitting a four pin radio plug or a five pin radio plug to be used with the main adapter body.

17. The universal keying adaptor according to claim 13, wherein the two-way radio is a citizen band radio.

* * * * *